United States Patent
Baumgartner et al.

(10) Patent No.: US 6,717,289 B2
(45) Date of Patent: Apr. 6, 2004

(54) METHOD FOR CONTROLLING THE EMERGENCY POWER SUPPLY AND THE EMERGENCY POWER SUPPLY SYSTEM, IN PARTICULAR FOR A VEHICLE OCCUPANT PROTECTION SYSTEM

(75) Inventors: Walter Baumgartner, Wörth/Donau (DE); Albrecht Föll, Regensburg (DE); Gregor Weigl, Schnufenhofen (DE)

(73) Assignee: Siemens Aktiengesellscahft, Munich (DE)

( * ) Notice: Subject to any disclaimer, the term of this patent is extended or adjusted under 35 U.S.C. 154(b) by 78 days.

(21) Appl. No.: 10/174,099

(22) Filed: Jun. 17, 2002

(65) Prior Publication Data
US 2002/0171293 A1 Nov. 21, 2002

Related U.S. Application Data

(63) Continuation of application No. PCT/DE99/04001, filed on Dec. 16, 1999.

(51) Int. Cl.[7] .................................................. B02L 3/00
(52) U.S. Cl. ........................ 307/10.1; 307/38; 180/271; 280/734
(58) Field of Search ................................ 307/10.1, 326, 307/121, 38, 29, 86, 66, 64, 80; 280/755, 728.1, 734; 701/45–47; 180/271–290

(56) References Cited

U.S. PATENT DOCUMENTS

| | | | |
|---|---|---|---|
| 5,522,617 A | 6/1996 | Swart | |
| 6,512,308 B2 * | 1/2003 | Boezen et al. | 307/10.1 |
| 6,534,882 B2 * | 3/2003 | Belau | 307/10.1 |
| 2001/0022471 A1 * | 9/2001 | Cook et al. | 307/10.1 |

FOREIGN PATENT DOCUMENTS

DE 195 17 698 A1 11/1996

* cited by examiner

*Primary Examiner*—Gregory J. Toatley, Jr.
(74) *Attorney, Agent, or Firm*—Laurence A. Greenberg; Werner H. Stemer; Ralph E. Locher

(57) ABSTRACT

A method for controlling an emergency power supply of at least two power loads, includes steps of: assigning an energy storage device of the power supply to one of the at least two power loads; and after a failure of a power source for a predetermined autarchy time period, using the energy storage device to ensure that power is supplied to the one of the at least two power loads; and after an occurrence of at least one predetermined condition, using residual energy present in the energy storage device to supply power to another one of the at least two power loads. Preferably a firing device of a vehicle occupant protection system is used as one of the power loads.

11 Claims, 3 Drawing Sheets

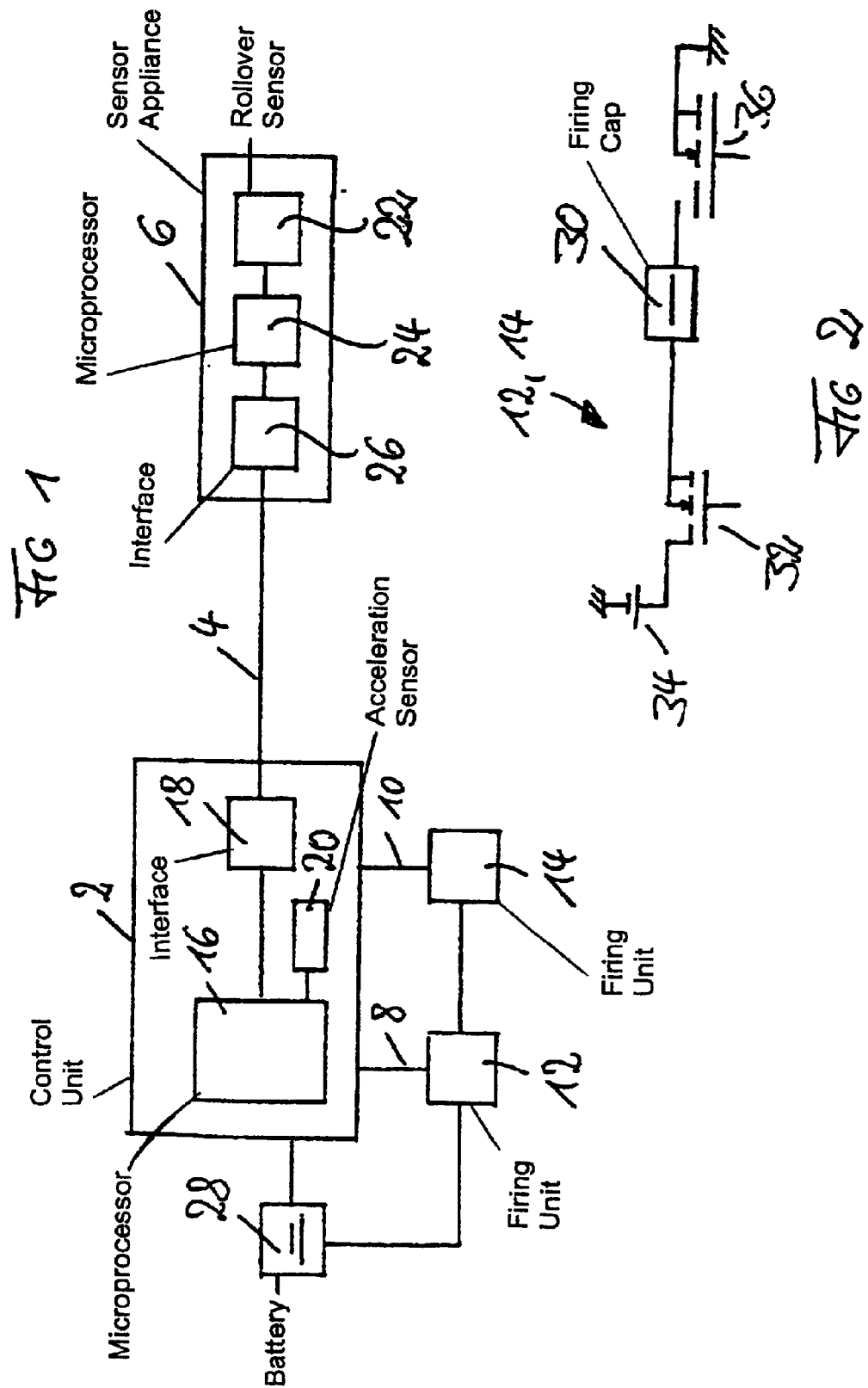

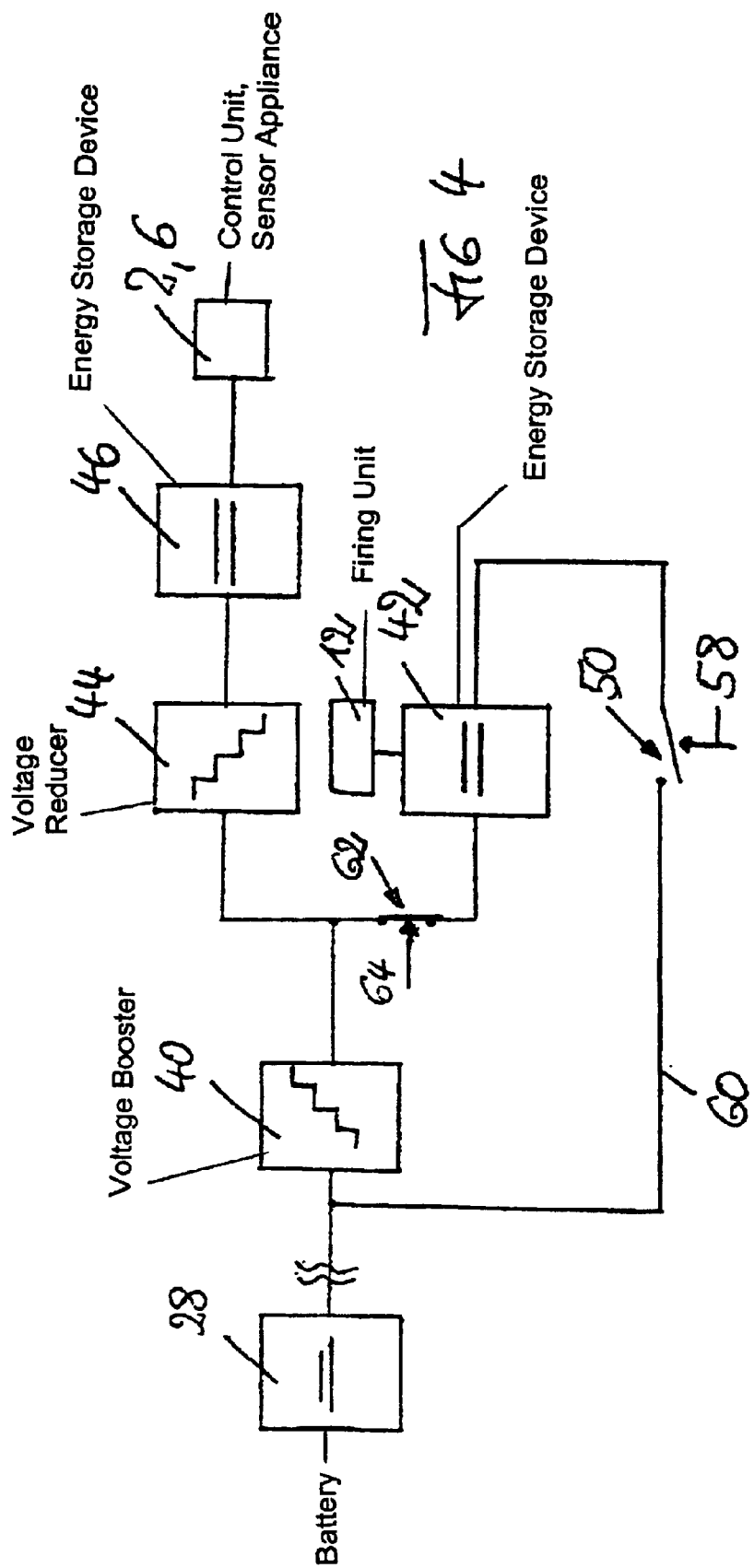

METHOD FOR CONTROLLING THE EMERGENCY POWER SUPPLY AND THE EMERGENCY POWER SUPPLY SYSTEM, IN PARTICULAR FOR A VEHICLE OCCUPANT PROTECTION SYSTEM

CROSS-REFERENCE TO RELATED APPLICATION

This application is a continuation of copending International Application No. PCT/DE99/04001, filed Dec. 16, 1999, which designated the United States and was not published in English.

BACKGROUND OF THE INVENTION

FIELD OF THE INVENTION

The invention relates to a method for controlling the power supply system of at least two power loads, in particular a power load and a firing device of a vehicle occupant protection system. The invention also relates to an emergency power supply system for a vehicle occupant protection system.

Modern vehicle occupant protection systems generally operate in such a way that one or more control units are connected to sensors that detect states that are dangerous for the vehicle occupants and trigger vehicle occupant protection devices such as airbags, seatbelt pretensioners, and other such devices in accordance with predetermined algorithms. The vehicle occupant protection devices are frequently triggered by firing devices that have an electrically fired firing cap whose firing leads to the explosive generation of propellant gas with which an airbag is inflated, a seatbelt pretensioning device tensioned, etc.

In the case of an accident, the vehicle battery can be disconnected from the vehicle occupant protection system so that an emergency power supply has to be ensured at least for a specific time period after an impact. This time period is generally referred to as the autarchy time period. In the case of a head-on impact or side impact this autarchy time period is, for example, 125 msec.

Recent vehicle occupant protection systems are also active in the case of a rollover and trigger corresponding protection devices, for example, airbags in the head region and additional seatbelt pretensioners. A rollover takes place more slowly than a head-on impact or side impact. The protection devices are therefore generally activated later than the start of the vehicle deceleration which leads to an impact. The autarchy time period for rollover protection is therefore, for example, 1 sec.

Capacitors, which are charged to a higher voltage than the battery, if appropriate using voltage boosters or step-up voltage converters, are generally used as energy reserves or energy storage devices for the emergency power supply. Such energy storage devices for maintaining the power supply of the vehicle occupant protection system using the respective expedient autarchy time are costly both in terms of space and time.

SUMMARY OF THE INVENTION

It is accordingly an object of the invention to provide an emergency power supply system and a method for controlling the emergency power supply of at least two loads which overcome the above-mentioned disadvantages of the prior art apparatus and methods of this general type.

In particular, the invention is based on the object of reducing the expenditure necessary for the emergency power supply.

If during the autarchy time period the energy storage device has applied power to the power load assigned to it in order to carry out a function, the energy storage device is generally not completely discharged but rather, owing to the voltage demand of the power load, still contains a residual energy owing to ohmic line resistances, etc. This energy can be used to supply power to the other power load. If no discharge has taken place via the assigned power load, a large proportion of the stored energy is generally available at the end of the autarchy time period.

The predetermined conditions that lead to using the residual energy can be of different types. They may consist in a decision being made very early that the assigned power load is not required, that it has been activated, or simply that the autarchy time has expired.

The inventive method can be used for any emergency power supply systems in which, similarly to the vehicle occupancy protection system, power loads are supplied with different autarchy time periods and/or different voltage requirements by energy storage devices that are used for the emergency power supply. It goes without saying that the power load that is supplied with the residual energy of the energy storage device assigned to another power load generally has a longer autarchy time period and lower voltage requirements than the power load that is supplied by the energy storage device whose residual energy is used. However, power loads with higher voltage requirements can also be supplied with residual energy via suitable voltage converters.

As a result of using the available residual energy, the energy storage device or storage devices which is/are additionally supplied can be made smaller. Furthermore, less energy has to be stored for the emergency power supply.

With the foregoing and other objects in view there is provided, in accordance with the invention, a method for controlling an emergency power supply of at least two power loads. The method includes steps of: assigning an energy storage device of the power supply to one of the at least two power loads; after a failure of a power source for a predetermined autarchy time period, using the energy storage device to ensure that power is supplied to the one of the at least two power loads; and after an occurrence of at least one predetermined condition, using residual energy present in the energy storage device to supply power to another one of the at least two power loads.

In accordance with an added mode of the invention, a firing device of a vehicle occupant protection system is provided as one of the at least two power loads, and a power load of the vehicle occupant protection system is provided as one of the at least two power loads.

With the foregoing and other objects in view there is provided, in accordance with the invention, an emergency power supply system for a vehicle occupant protection system, that includes: at least one control unit; a firing device associated with an autarchy time period; a first energy storage device for supplying energy to the control unit; a second energy storage device for supplying energy to the firing device; and an energy source for supplying energy to the first energy storage device and to the second energy storage device. When the energy source fails, the first energy storage device and the second energy storage device supply energy to the control unit and to the firing device during predetermined autarchy time periods. The control unit is associated with an autarchy time period that is longer than the autarchy time period associated with the firing device. The emergency power supply system also includes a controllable switch for connecting the second energy storage device to the first energy storage device so that residual energy available in the second energy storage device is available for supplying power to the control unit.

In accordance with an added feature of the invention, the switch is controlled to close after an expiration of the autarchy time period associated with the firing device.

In accordance with an additional feature of the invention, the switch is controlled to close after the firing device is fired.

In accordance with another feature of the invention, the control unit controls the switch and the firing device.

In accordance with a further feature of the invention, the firing device is configured for triggering a first safety device in an event of a head-on impact; and the control unit is configured to control a triggering of a second safety device in an event of a rollover.

In accordance with a further added feature of the invention, the firing device includes a firing cap and two electronic switches connected in series with the firing cap; and the switches are switched to a conductive state in order to fire the firing cap.

In accordance with a further additional feature of the invention, there is provided, a voltage booster having an output connected to the second energy storage device. A third energy storage device provides energy to the control unit. The third energy storage device is connected downstream of the energy source. A voltage reducer has an input connected to the output of the voltage booster. The voltage reducer has an output connected to the third energy storage device.

In accordance with yet an added feature of the invention, the second energy storage device is connected to the switch via the voltage reducer and the voltage booster.

In accordance with yet an additional feature of the invention, there is provided, a voltage booster having an output connected to the second energy storage device; and voltage reducer having an input connected to the output of the voltage booster. The voltage reducer has an output connected to the second energy storage device. The voltage booster has an input connected to the second energy storage device by the switch.

Other features which are considered as characteristic for the invention are set forth in the appended claims.

Although the invention is illustrated and described herein as embodied in a method for controlling the emergency power supply and the emergency power supply system, in particular for a vehicle occupant protection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a vehicle occupant protection system;

FIG. 2 shows a circuit of a firing device;

FIG. 4 is a block circuit diagram of a further embodiment of the emergency power supply system.

DESCRIPTION OF THE PREFERRED EMBODIMENTS

Figure 3:
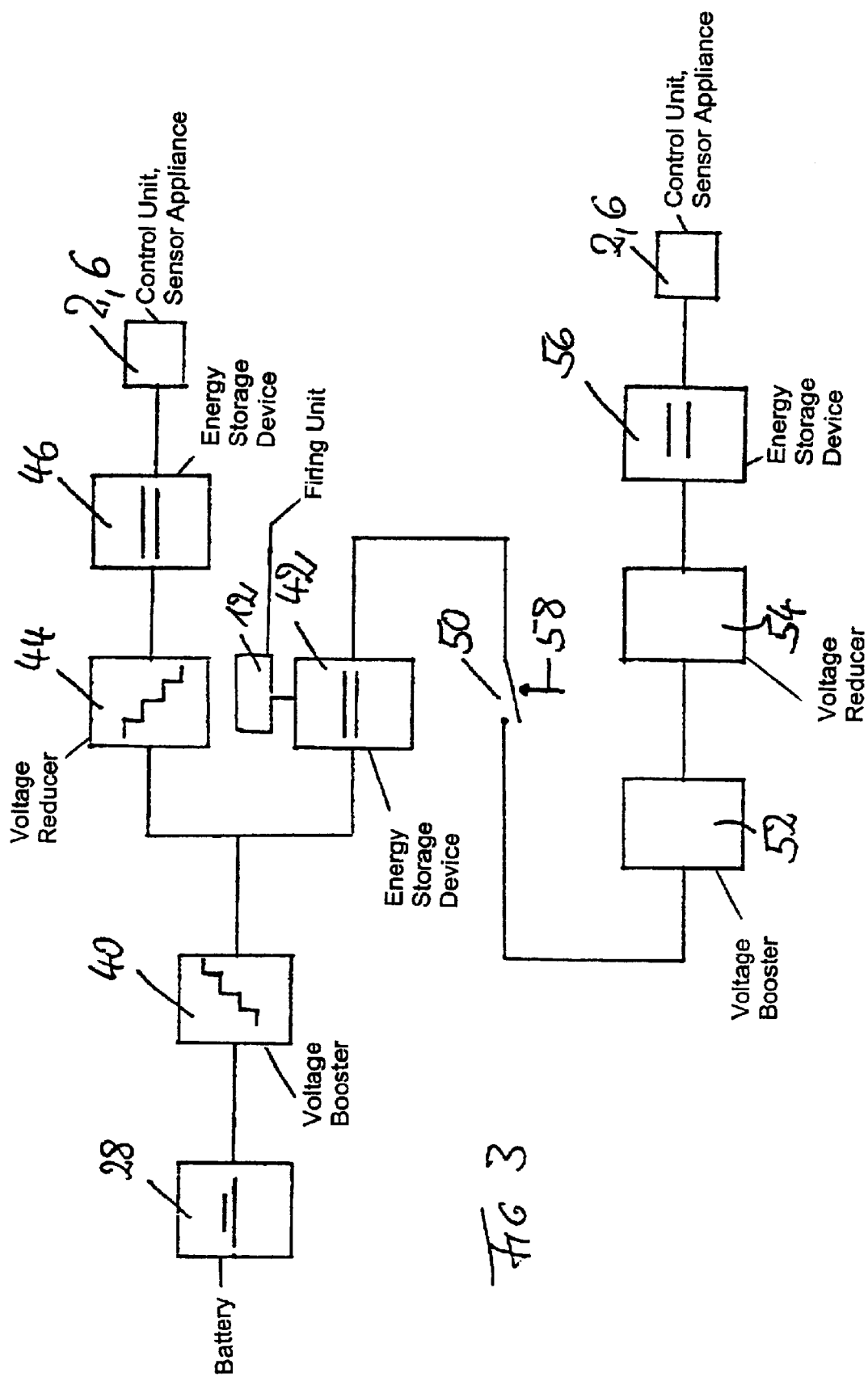
FIG. 3 is a block circuit diagram of an emergency power supply system.

Referring now to the figures of the drawing in detail and first, particularly, to FIG. 1 thereof, there is shown a control unit 2 that is connected to a sensor appliance 6 by a line 4 and to firing units 12 and 14 by lines 8 and 10.

The control unit 2 contains a microprocessor 16 that is connected to the line 4 by an interface 18. The control unit 2 also contains a linear acceleration sensor 20 that is connected to an input of the microprocessor 16.

The sensor appliance 6 contains a rollover sensor 22 that is connected to the control unit 2 by line 4 via a microprocessor 24 and an interface 26.

In order to supply the system with power, a battery 28 is used, for example a vehicle battery, which is connected to the control unit 2 and the firing units 12 and 14. Power is supplied to the sensor appliance 6 via the line 4, which is advantageously of multi-conductor construction.

FIG. 2 shows a detail from a circuit contained in one of the firing units 12 or 14. A first electronically actuated switch 32 connects a firing cap 30 to a power source 34, which is fed by the battery 28. A second electronically actuated switch 36 connects the firing cap 30 to ground. The switch 36 is, for example, a Safing switch which closes at a specific minimum deceleration of the vehicle. The deceleration is sensed by a Safing sensor. The switch 32 closes if an algorithm, which runs in the microprocessor 16, processes signals from one or more sensors 20 and generates a firing signal via the line 8. If both switches 32 and 36 are closed and the voltage source or power source 34 is sufficiently charged, the firing cap 30 fires.

The design and function of the vehicle occupant protection system described are known per se and therefore do not need to be explained in detail. The design can be modified in many different ways. It is possible, for example, to provide a plurality of firing appliances. The control unit 2, and if appropriate further sensors appliances 6 which are present, can be combined in different ways and distributed within the vehicle. The firing of the firing cap 30 can be triggered by a smaller or larger number of switches etc.

The voltage requirements to supply power to the control unit 2 or a sensor appliance 6, which can, if appropriate, be directly connected to a firing appliance, are generally below the voltage which is necessary to fire one of the firing units 12 and 14.

In FIG. 1, it is assumed that the firing unit 12 or firing units 12 is/are to be fired in the event of a head-on impact or side impact, whereas the firing unit 14 or firing units are to be fired in the event of a rollover sensed by the sensor unit 6. As explained at the beginning the autarchy time period, during which the firing unit 12 or firing units 12 and the associated control unit or units have to be operationally capable in the event of the battery 28 failing, is significantly shorter than the autarchy time period during which the firing unit 14 or firing appliances 14 and the necessary control units have to be operationally capable. In the present case, the necessary control units are the firing unit 2 and the sensor appliance 6. The power supply from the battery 28 can be interrupted, for example, in the event of a sudden vehicle deceleration, by the battery 28 being torn from its anchoring and the connecting line being severed.

FIG. 3 shows the basic design of the emergency power supply system for the vehicle occupant protection system shown in FIG. 1. A voltage booster 40 connects the battery 28 to an energy storage device 42 that is embodied as a capacitor and to a voltage reducer 44 that lies in parallel with the energy storage device 42. The voltage reducer 44 contains a step-down regulator that is known per se in terms of its design. The voltage booster 40 contains a step-up regulator that is known per se in terms of its design. The output of the voltage reducer 44 is connected to a further energy storage device 46 which is embodied as a capacitor and which is used to supply emergency power to the control unit 2 (See FIG. 1) and to the sensor appliance 6. The energy storage device capacitor 42 is used to supply voltage to the firing unit 12 or firing units 12. The step-up and step-down controllers contain, in a manner known per se, for example, a coil, an FET and a diode.

The autarchy time period of the energy storage device 42 is such that it corresponds to that for the firing unit 12 or firing units 12 to be fired in the event of a head-on impact or side impact, for example 125 msec.

The autarchy time period that has to be ensured for the control unit 2 and the sensor appliance 6 is, for example, 1 sec. It goes without saying that the aforesaid autarchy time periods are only exemplary. So that the energy storage device 46 can be made as small as possible for this long autarchy time period, a controllable switch 50 is connected downstream of the energy storage device 42. The controllable switch 50 is connected via a further voltage booster 52 and a voltage reducer 54 to an energy storage device 56 that is embodied as a capacitor and that also serves, in the example illustrated, to supply emergency power to the control unit 2 and to the sensor appliance 6.

The emergency power supply described functions as follows:

It will be assumed that in the event of an impact, the battery 28 is disconnected from the system, the switch 50 is open and the energy storage devices 42 and 46 are charged. It would also be assumed that the firing units 12 are fired by a firing pulse triggered by the control unit 2 so that the energy storage device 42 which corresponds to the capacitor 34 illustrated in FIG. 2 discharges via the closed switches 32 and 36 and the firing cap 30 and fires the firing cap 30. The resistors of the switches 32 and 36 and of the firing cap 30 have the effect that the energy storage device 42 is not discharged from the necessary firing voltage of, for example, 25 volts to zero but rather remains at a residual voltage of 7 to 8 volts. The switch 50 is closed, after the firing of the firing unit or the firing units 12 by a control pulse that is triggered by the firing current or generated by the control unit 2. The control pulse is fed to the control input 58 of the switch 50 so that the residual energy of the energy storage device 42 is fed to the voltage booster 52, and after passing through the voltage reducer 54 in the energy storage device 56 is available for the supplementary power supply of the control unit 2 and of the sensor appliance 6. As a result of this additionally available power, the energy storage device 46 can be made weaker and the necessary autarchy time period can be obtained using the two energy storage devices 46 and 56.

The circuit can also be embodied in such a way that the control unit 2 encloses the switch 50 after the expiration of the autarchy time period of the firing unit or firing units 12 so that the entire energy which is still located in the energy storage device 42 is available for supplying power to the control unit 2 and the sensor appliance 6 during the longer autarchy time period of these units if the firing unit 12 is not fired.

For the firing unit 14 or the firing units 14 which is/are to be triggered only in the case of a rollover and whose autarchy time period is correspondingly longer than that of the firing unit 12 or the firing units 12, a further energy storage device which is independent of the energy storage device 42 can be provided. Whenever, in the event of a rollover, the firing unit 12 or the firing units 12 is/are to be fired, this further energy storage device with the long autarchy time period is also connected to the firing unit 12 or the firing units 12.

FIG. 4 shows an embodiment of an emergency power supply system which is modified in comparison with FIG. 3. The modification consists in the fact that the assemblies 52, 54 and 56 of FIG. 3 are missing and the switch 50 is connected via a line 50 to the input of the voltage booster 40. A further switch 62 that has a control input 64 is located in the feeder line to the storage capacitor or energy storage device 42.

The function of the system in FIG. 4 corresponds to that in FIG. 3 with the difference that at the same time as the closing of the switch 50, the switch 62 is opened so that residual energy contained in the energy storage device 42 is fed to the input of the voltage booster 40 and from there is available for the energy storage device 42 via the voltage reducer 44 so that the energy available for the control unit 2 or the sensor unit 6 is increased. In FIG. 4, the double line between the battery 28 and the voltage booster 40 indicates that in the case of a crash, the battery 28 is disconnected from the rest of the system, which ensures a battery-independent power supply during predetermined autarchy times.

In the embodiments described, the energy storage devices 42, 46 and 56 are each supplied with regulated voltages. It goes without saying that this is not absolutely necessary.

The circuits described can be modified in various ways. The essential feature is that residual energy remaining in the energy storage device of a load is additionally used to supply power to another power load.

We claim:

1. A method for controlling an emergency power supply of at least two power loads, which comprises:

assigning an energy storage device of the power supply to one of the at least two power loads;

after a failure of a power source for a predetermined autarchy time period, using the energy storage device to ensure that power is supplied to the one of the at least two power loads; and after an occurrence of at least one predetermined condition, using residual energy present in the energy storage device to supply power to another one of the at least two power loads.

2. The method according to claim 1, which comprises: providing a firing device of a vehicle occupant protection system as one of the at least two power loads, and providing a power load of the vehicle occupant protection system as one of the at least two power loads.

3. An emergency power supply system for a vehicle occupant protection system, comprising:

at least one control unit;

a firing device associated with an autarchy time period;

a first energy storage device for supplying energy to said control unit;

a second energy storage device for supplying energy to said firing device;

a controllable switch; and an energy source for supplying energy to said first energy storage device and to said second energy storage device;

when said energy source fails, said first energy storage device and said second energy storage device supplying energy to said control unit and to said firing device during predetermined autarchy time periods;

said control unit associated with an autarchy time period being longer than the autarchy time period associated with said firing device; and said controllable switch for connecting said second energy storage device to said first energy storage device so that residual energy available in said second energy storage device is available for supplying power to said control unit.

4. The emergency power supply system according to claim 3, wherein said switch is controlled to close after an expiration of the autarchy time period associated with said firing device.

5. The emergency power supply system according to claim 3, wherein said switch is controlled to close after said firing device is fired.

6. The emergency power supply system according to claim 3, wherein said control unit controls said switch and said firing device.

7. The emergency power supply system according to claim 3, in combination with a first safety device and a second safety device, wherein:

said firing device is configured for triggering the first safety device in an event of a head-on impact; and said control unit is configured to control a triggering of the second safety device in an event of a rollover.

8. The emergency power supply system according to claim 3, wherein:

said firing device includes a firing cap and two electronic switches connected in series with said firing cap; and said switches are switched to a conductive state in order to fire said firing cap.

9. The emergency power supply system according to claim 3, comprising:

a voltage booster having an output connected to said second energy storage device;

a third energy storage device for providing energy to said control unit, said third energy storage device connected downstream of said energy source; and a voltage reducer having an input connected to said output of said voltage booster, said voltage reducer having an output connected to said third energy storage device.

10. The emergency power supply system according to claim 8, wherein said second energy storage device is connected to said switch via said voltage reducer and said voltage booster.

11. The emergency power supply system according to claim 3, comprising:

a voltage booster having an output connected to said second energy storage device; and a voltage reducer having an input connected to said output of said voltage booster;

said voltage reducer having an output connected to said second energy storage device; and said voltage booster having an input connected to said second energy storage device by said switch.

* * * * *